UNITED STATES PATENT OFFICE.

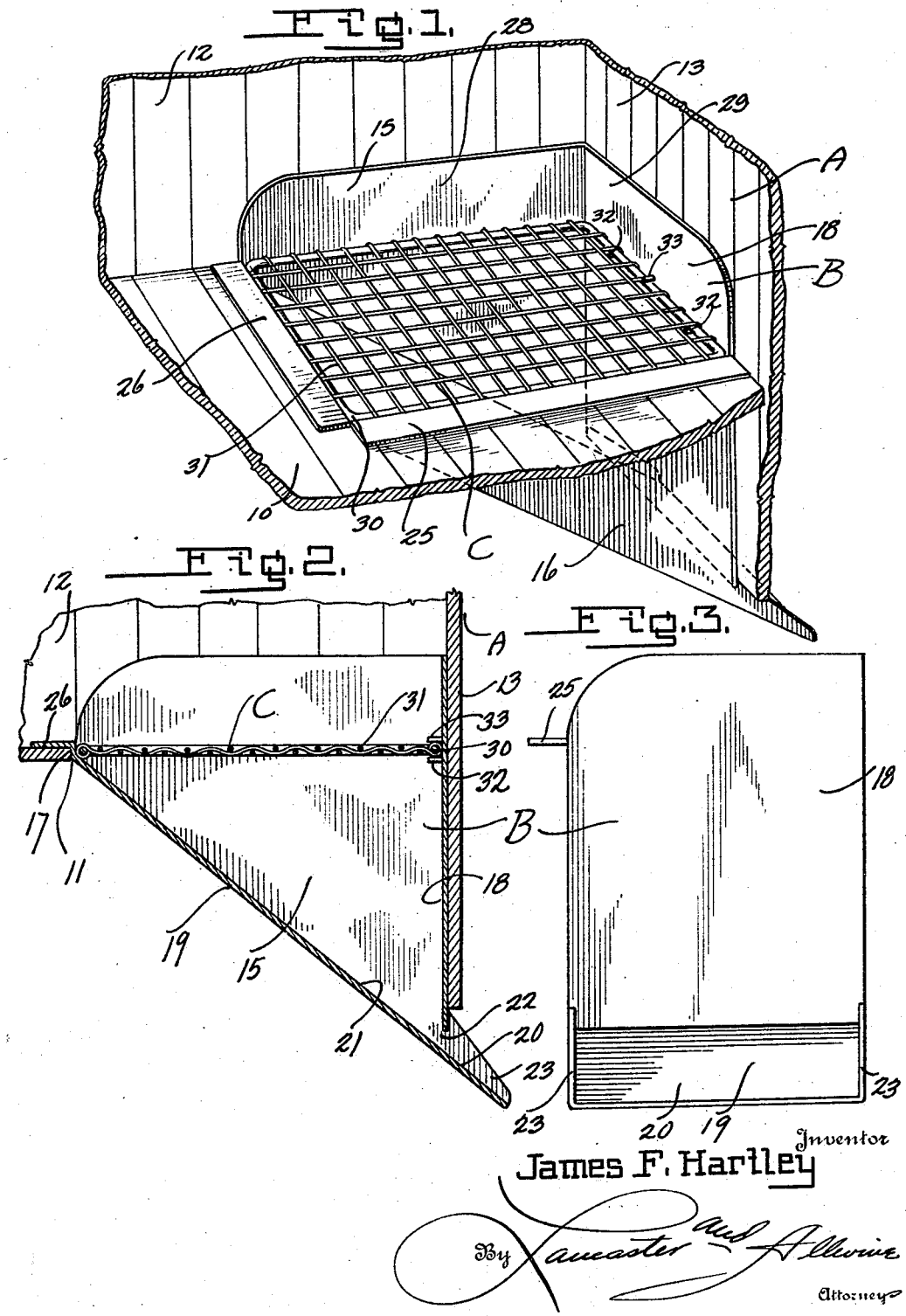

JAMES F. HARTLEY, OF CHATTANOOGA, TENNESSEE.

WASTE CHUTE.

1,416,022. Specification of Letters Patent. Patented May 16, 1922.

Application filed January 13, 1921. Serial No. 436,980.

*To all whom it may concern:*

Be it known that I, JAMES F. HARTLEY, a citizen of the United States, residing at Chattanooga, in the county of Hamilton and State of Tennessee, have invented certain new and useful Improvements in Waste Chutes, of which the following is a specification.

This invention relates to improvements in waste chutes for use in animal cages.

The primary object of the invention is the provision of a waste chute for use in animal cages, which will maintain the cage in a clean and sanitary condition at all times.

A further object of the invention is the provision of a waste chute, complete as an accessory for use in animal cages, necessitating a minimum of alteration to the cage itself.

A further object of the invention is the provision of a waste chute of the above described character, which is adapted to convey animal excreta from the interior of the cage to the exterior thereof, thus preventing a foul or unsanitary atmosphere within the cage.

Other objects and advantages will be apparent during the course of the following detailed description.

In the accompanying drawings forming a part of this specification, and in which like reference characters designate like parts throughout the same:

Figure 1 is a fragmentary perspective view of a corner of an animal cage having the improved waste chute attached thereto.

Figure 2 is a cross sectional view taken through a section of the animal cage and through the improved waste chute.

Figure 3 is a rear elevation of the waste chute.

In the drawings, wherein for the purpose of illustration is shown a preferred embodiment of my invention, the letter A designates a cage or other structure adapted for retaining animals, having the housing B detachably mounted therein, said housing having a foraminous cover C mounted thereon.

The cage A is of ordinary construction, such as is generally used for retaining animals. It comprises a floor 10, having an opening 11 therein, preferably in a corner of the cage adjacent the sides 12 and 13.

The housing B is of metal construction, being an integral and unitary structure. It comprises the parallel sides 15 and 16; the parallel end or side sections 17 and 18; and the inclined platform or floor 19. The end 17 is considerably shorter than the end 18, and denotes the forward end of the housing, to the lower end of which, the upper end of the floor 19 is integrally connected. The floor 19 slopes downwardly at an angle of approximately 45° toward the end or side 18, and has a projecting portion 20 extending exteriorally of the housing B. The side or end 18 terminates short of the inner surface 21 of the floor 19, to provide a space 22 for the free exit of any foreign materials, dropping upon the surface 21 of the floor 19. The projecting portion 20 is provided with lateral guide flanges 23, bent upwardly from the floor 19 and on each side thereof.

The housing B is detachably supported upon the floor 10 of the cage A by the flanges 25 and 26, formed outwardly upon the side and end sections 16 and 17 respectively, and bent at substantially right angles to the plane of the end and side; said flanges adapted to overlie the floor 10 to support the housing B in position in the opening 11. The side and end 15 and 18 are provided with extension 28 and 29 respectively projecting upwardly from the level of the flanges 25 and 26 and adapted to abut and engage the sides 12 and 13 respectively of the cage A above the level of the floor 10, to prevent the fouling and unsanitary appearance of the cage A.

The foraminous cover C comprises the frame 30, about which are twisted the wires 31 as in ordinary construction.

In positioning the cover C upon the housing B, the forward end thereof is supported by and rests upon the projecting lugs 32; while the end of the cover C opposite the end supported by the lugs 32 rests upon the upper portion of the platform 19 adjacent the ends 17, substantially as shown in Figure 2 of the drawings. In order to prevent the cover C from movement with respect to the housing B, a retaining lug 33 is provided in the side 18, in the same manner as the lug 32, and located above said lugs 32 in such manner that the forward end of the cover C can be readily inserted with the lugs 32 beneath the cover and supporting the same, and the lug 33 above the forward end of the frame, as is clearly shown in Figure 2 of the drawings.

Thus an improved waste chute has been provided, in which the housing B is detachably connected within the opening 11 of the cage A, as clearly shown in Figure 1 of the drawings. All of the parts of the casing, and especially the housing B, are readily accessible for cleaning purposes. Furthermore the waste chute is formed of materials which would render the waste chute economical to construct.

It is to be understood that the form of my invention herewith shown and described is to be taken as a preferred example of the same, and that various changes in the shape, size and arrangement of parts, may be resorted to without departing from the spirit of the invention, or the scope of the subjoined claims.

I claim:

1. As an article of manufacture, a housing including a plurality of sides, certain of said sides projecting upwardly of certain other of said sides, and an inclined floor extending from one side of said housing to an opposite side, said last mentioned side having an opening therein adjacent said inclined floor.

2. In a waste chute, the combination with a cage including walls and a floor, of a housing comprising a plurality of sides, certain of said sides having supporting flanges adapted to rest upon the floor of said cage, and certain other of said sides adapted to extend upwardly of said supporting flanges, and lie in abutment with said walls of the cage, and a foraminous cover detachably mounted upon said housing in the same plane as said supporting flanges, said housing having an aperture therein below the level of said covering.

3. In a waste chute, the combination with a cage including walls and a floor, of a housing comprising a plurality of sides, certain adjacent sides having supporting flanges adapted for disposition upon the floor of said cage, certain other of said sides extending upwardly above the supporting flanges, and adapted to abut said cage walls, said housing having a floor therein inclined from one extremity thereof to the other extremity, said housing having an aperture therein adjacent the lowest portion of said inclined floor, and a foraminous cover upon said housing detachably mounted below the tops of said upwardly extending side.

4. As an article of manufacture, a housing including a pair of parallel side sections, one of said side sections having a supporting flange thereon, bent at an angle to said side, and the other side section extending upwardly of said supporting flange; a pair of parallel end sections connecting said side sections, one of said end sections being relatively shorter than the other, and having a supporting flange thereon bent at right angles thereto, and lying in the same plane as said supporting flange upon said side section, said other or longer end section extending upwardly from said supporting flange of said end section, and an inclined floor connecting the bottom of said end section at the lower portion thereof extending outwardly from said longer end section, said longer end section having an opening therein adjacent said inclined floor.

JAMES F. HARTLEY.